(12) United States Patent
Asomaning et al.

(10) Patent No.: US 8,575,082 B2
(45) Date of Patent: Nov. 5, 2013

(54) ADDITIVE TO IMPROVE FLOW, REDUCE POWER CONSUMPTION AND PRESSURE DROP IN HEAVY OIL PIPELINES

(71) Applicants: Samuel Asomaning, Sugar Land, TX (US); Scott E. Lehrer, The Woodlands, TX (US)

(72) Inventors: Samuel Asomaning, Sugar Land, TX (US); Scott E. Lehrer, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/693,945

(22) Filed: Dec. 4, 2012

(65) Prior Publication Data

US 2013/0096043 A1   Apr. 18, 2013

Related U.S. Application Data

(62) Division of application No. 12/547,253, filed on Aug. 25, 2009, now Pat. No. 8,342,198.

(60) Provisional application No. 61/092,114, filed on Aug. 27, 2008.

(51) Int. Cl.
  *C07C 39/06* (2006.01)
  *C10M 145/20* (2006.01)

(52) U.S. Cl.
  USPC ................................ 508/531; 208/22; 208/23

(58) Field of Classification Search
  USPC ...................................... 508/531; 208/22, 23
  See application file for complete search history.

(56) References Cited

U.S. PATENT DOCUMENTS

| | | | |
|---|---|---|---|
| 5,021,498 A | 6/1991 | Stephenson et al. | |
| 5,100,531 A | 3/1992 | Stephenson et al. | |
| 5,681,451 A * | 10/1997 | Hart | 208/177 |
| 6,120,678 A | 9/2000 | Stephenson et al. | |
| 6,187,172 B1 | 2/2001 | Plummer | |
| 2002/0173569 A1 | 11/2002 | Karhu et al. | |
| 2006/0014654 A1 | 1/2006 | Varadaraj et al. | |
| 2006/0144595 A1 | 7/2006 | Milligan et al. | |
| 2007/0175512 A1 | 8/2007 | Henaut et al. | |
| 2007/0221539 A1 * | 9/2007 | Cohrs et al. | 208/18 |
| 2008/0064614 A1 | 3/2008 | Ahrenst et al. | |
| 2008/0149530 A1 | 6/2008 | Milligan et al. | |
| 2010/0025290 A1 * | 2/2010 | Feustel et al. | 208/14 |

FOREIGN PATENT DOCUMENTS

| | | | |
|---|---|---|---|
| EP | 1 767 611 | * | 3/2007 |
| SU | 1666502 A1 | | 9/1989 |
| SU | 1666502 | * | 7/1991 |
| WO | WO 2008/083724 | * | 7/2008 |

OTHER PUBLICATIONS

Derwent Abstract of SU 1666502.*
J-F. Argillier, et al., "Influence of Asphaltene Content and Dilution on Heavy Oil Rheology," SPE 69711, Mar. 12-14, 2001, SPE International Thermal Operations and Heavy Oil Symposium, Porlamar, Margarita Island, Venezuela.
P. Gateau, et al., "Heavy Oil Dilution", 2004, Oil and Gas Science and Technology, vol. 59, No. 5 pp. 503-509.
G. Flaherty, "A Guide to Bitumen/Heavy Oil Viscosity Blending", May 9, 2007, The Canadian Heavy Oil Association (CHOA) Technical Luncheon, EnCana Corporation.

* cited by examiner

*Primary Examiner* — Walter D Griffin
*Assistant Examiner* — Renee E Robinson
(74) *Attorney, Agent, or Firm* — Mossman, Kumar & Tyler PC

(57) ABSTRACT

A drag reducing additive for heavy oil, such as crude oil, includes a polymeric alkyl-substituted phenol formaldehyde resin and a solvent having at least one of an ester (e.g. ethyl acetate), an aldehyde (e.g. butyraldehyde), and an aromatic hydrocarbon (e.g. toluene, xylene, and the like), or mixtures thereof. When used together with a diluent (e.g. condensate, naphtha, or the like), the additive may reduce viscosity of the combined oil, diluent, and additive by at least 20%, increase throughput by at least 6%, reduce power consumption by at least 3%, reduce the diluent proportion by at least 3%, or some combination of these effects, as compared with an otherwise identical heavy oil without the additive.

11 Claims, 2 Drawing Sheets

ADDITIVE TO IMPROVE FLOW, REDUCE POWER CONSUMPTION AND PRESSURE DROP IN HEAVY OIL PIPELINES

CROSS-REFERENCE TO RELATED APPLICATION

This application is a divisional patent application of U.S. Ser. No. 12/547,253 filed Aug. 25, 2009 issued as U.S. Pat. No. 8,342,198 on Jan. 1, 2013, which in turn claims the benefit of U.S. Provisional Patent Application No. 61/092,114 filed Aug. 27, 2008, all of which are incorporated herein by reference.

TECHNICAL FIELD

The invention relates to methods and compositions for reducing the drag of heavy oils, such as crude oils, and most particularly relates, in one non-limiting embodiment, to methods and compositions for treating heavy oils to reduce viscosity, increase throughput, reduce power consumption, and/or reduce the diluent proportion thereof as they are being transported through a conduit such as a pipeline.

TECHNICAL BACKGROUND

Seventy percent of the world's known oil reserves are non-conventional including heavy oil, extra heavy oil, and bitumen. These oils' high viscosities present a challenge in transporting them through pipelines. Traditionally, producers have used large quantities of condensate as a diluent to reduce the viscosity and make these oils more pumpable. The condensate is typically evaporated and pumped back to the production site via separate pipelines. With rising oil and gas prices, these condensates have become very expensive and their availability has become limited. The energy required to evaporate the condensate from the heavy oil and for its transmission back to the production site has also become increasingly expensive. Thus, there is a significant economic incentive to find methods and compositions to improve the efficiency of transmitting heavy oils via pipelines.

Drag reducers are well known to be added to crude oil being transported through pipelines to reduce the drag of the oil being pumped therethrough to enhance throughput, reduce pressure drop, reduce the power requirements and thus the cost of operating the pipelines. These materials can take various forms, including certain polymers in oil soluble suspensions, emulsions, pellets, gels, microfine powders and particulate slurries. High molecular weight polymers to reduce the friction pressure loss in pipelines are used in a wide variety of applications. Different families of pipeline drag reducers have been developed for optimal performance in different fluid types and under various pipeline conditions. Very high molecular weight polyalpha-olefins are often used as drag reducers for crude oils. However, polyalpha-olefins are subject to shear degradation as the drag reducer and the oil are pumped through successive pumping stations, and thus tend to lose their effectiveness over time and distance. They (i.e. high molecular weight polyalpha-olefin drag reducers) are also used in pipelines with turbulent flow only.

It would be desirable if new methods and compositions for improving flow of heavy oils, such as heavy crude oils and bitumens, for instance by reducing power consumption and pressure drop, particularly if an additive could be used that is not shear degraded over time and distance, or is degraded to a lesser extent than more conventional polyalpha-olefins. Further, it would be desirable to discover new compositions and methods that may be used in all flow regimes—laminar, transition to turbulence, and turbulent flow regimes.

SUMMARY

There is provided, in one non-limiting embodiment, a drag reducing additive that includes a polymeric alkyl-substituted phenol formaldehyde resin, and a solvent that in turn contains an ester, an aldehyde, an aromatic hydrocarbon and/or mixtures thereof.

Additionally there is provided in an alternative non-restrictive embodiment, a method of improving the flow of oil through a conduit. The method involves introducing to the oil an amount of a drag reducing additive effective to improve the flow of oil through the conduit. The additive includes a polymeric alkyl-substituted phenol formaldehyde resin and a solvent. Again, the solvent contains at least one of an ester, an aldehyde, an aromatic hydrocarbon or a mixture thereof.

In still another non-limiting embodiment, there is provided an oil having improved flow through a conduit. The improved oil includes an oil (e.g. a heavy oil or bitumen), a diluent, and an effective amount of a drag reducing additive. The drag reducing additive contains a polymeric alkyl-substituted phenol formaldehyde resin and a solvent as previously described.

DETAILED DESCRIPTION

Figure 1:
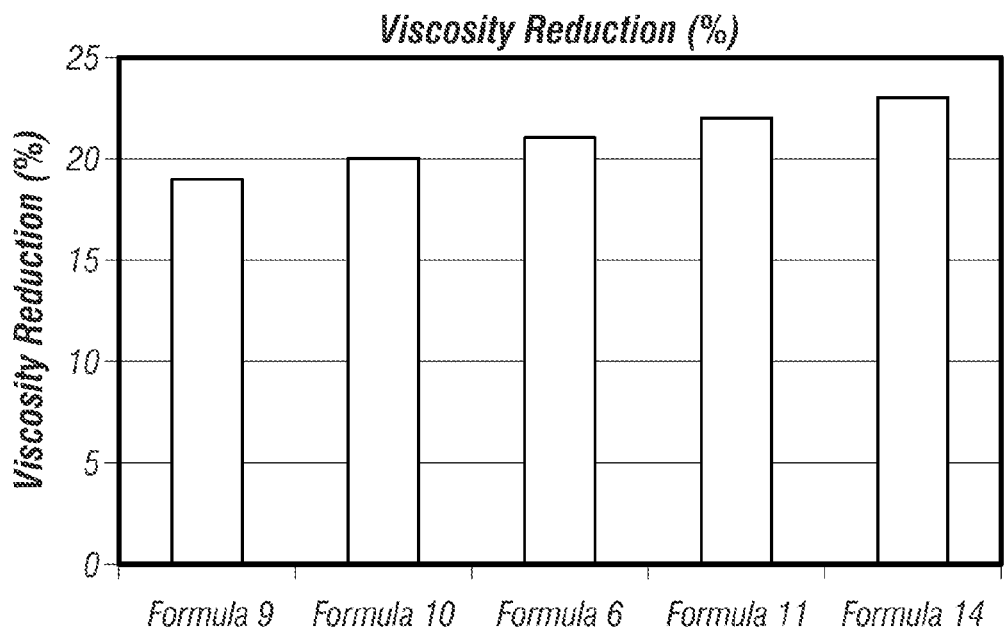
FIG. 1 is a graph presenting the viscosity reduction capabilities of five formulations herein added to a diluted heavy oil.

An additive has been discovered that reduces the viscosity of high viscosity crude oils and hence enhances their transmission through pipelines. The additive increases the throughput of pipelines, reduces pressure drop across pipelines and/or reduces the power consumed by the pumps used for pumping the crude oil along the pipelines. It also reduces the amount of diluent added to heavy oils to facilitate their transmission in pipelines.

More particularly, the drag reducing additive involves a formulation of a polymeric alkyl-substituted phenol formaldehyde resin in a solvent or solvent mixture containing an ester, an aldehyde, and/or an aromatic hydrocarbon in the proportion of from about 1 to about 20 weight percent resin, with the balance being the solvent or solvent package. Alternatively, the proportion of resin in the drag reducing additive ranges from about 5 independently to about 7 wt % or even to about 10 wt %. The formulation is applied to the heavy oil at a dose rate of from about 0.1 to about 2 percent by volume; alternatively from about 0.1 independently up to about 1 vol %.

In the polymeric alkyl-substituted phenol formaldehyde resin, the alkyl substituent may be branched or linear from $C_2$ to $C_{20}$, alternatively from $C_7$ independently to $C_{12}$ (by "independently" is meant that other alternate ranges include, but are not necessarily limited to, $C_2$-$C_{12}$ and $C_7$ to $C_{20}$). Indeed, in one non-limiting embodiment, branched alkyl substituents are particularly suitable because the branching gives better solubility characteristics, particularly at lower temperatures, which is very desirable since the resin may separate from the solvent mixture at certain low temperature conditions.

The polymeric alkyl-substituted phenol formaldehyde resin may have a weight average molecular weight of from about 1500 to about 30,000, with a particularly suitable molecular weight range being from about 2000 independently up to about 7000. As the molecular weight of the resin becomes large, the viscosity of the ensuing drag reducing additive becomes too high for them to be easily pumpable. Thus, in some non-restrictive respects, a relatively lower molecular weight resin is more suitable. These resin molecular weights are lower than the typical molecular weight ranges of more conventional polyalpha-olefin drag reducers, which because of their very high molecular weights and high viscosities have difficulty being efficiently introduced into hydrocarbon flows.

As a peculiarity of the method and composition herein, the solvent, solvent package or mixture is chosen such that none of the solvent components will end up in the jet fuel fraction of refinery product streams. For pipeline transportation to be possible, the petroleum stream being transported should meet a viscosity specification of 350 Centistokes or lower at 11.9 degrees Celsius, thus the heavy oil or bitumen is expected to have already been diluted with 10 to 30 volume percent of a diluent such as condensate or naphtha or the like prior to the addition of the drag reducing additive herein. The additive will then enhance the solvency characteristics of the naphtha or condensate beyond what is possible without the additive. Diluents may also include light crude oil, light synthetic crude oil and other light petroleum hydrocarbon fractions.

The ester component may be present in the solvent mixture in an amount based on the total solvent mixture (not the total drag reducing additive) of from about 10 to about 95 wt %, alternatively from about 45 independently to about 70 wt %. Suitable esters include, but are not necessarily limited to, ethyl formate, methyl formate, methyl acetate, ethyl acetate, ethyl propionate, dimethyl carbonate, diethyl carbonate, ethyl lactate, and the like and mixtures thereof. Other esters such as benzoates do improve the flow of the heavy oil, but they are not preferred because they will end up in the jet fuel fraction of the refinery fuels and thus will not be permitted by the refineries downstream.

The aldehyde component may also be present in the solvent mixture in an amount based on the total solvent mixture of from about 10 to about 95 wt %, in another non-restrictive version from about 20 to about 95 wt %, alternatively from about 45 independently to about 70 wt %. Suitable aldehydes include, but are not necessarily limited to, formaldehyde, acetaldehyde, propionaldehyde, butyraldehyde, benzaldehyde, and the like and mixtures thereof.

The aromatic hydrocarbon component of the solvent mixture may be present therein in an amount ranging from about 10 to about 95 wt %, alternatively from about 25 independently to about 50 wt %. Suitable aromatic hydrocarbons include, but are not necessarily limited to, toluene, xylene, refinery aromatic cuts boiling in a range from about 320-350° F. (about 160-177° C.), and the like and mixtures thereof.

The solvent or solvent mixtures may contain components other than these three, such as alcohols, e.g. isopropyl alcohol as one non-limiting example, but in most implementations it is preferred that the solvent not be one that is objectionable in the jet fuel fraction of a downstream refinery.

The drag reducing additive herein when used as described is capable of reducing the viscosity of the diluted heavy oil or bitumen by 20 percent or more, increasing throughput by 6 percent or more and reducing power consumption by 3 percent or more. The compositions and methods may also reduce diluent use by 3 percent or more. Thus, the methods and compositions described herein give the shipper or the pipeline company the option of selecting which performance characteristic—increased flow or throughput, reduced power, reduced pressure drop, or reduction in diluent proportion to focus on, depending on existing conditions both economic and physical. Indeed, multiple advantages may be achieved, although if multiple advantages are desired, the level of improvement for each advantage would not be expected to be the same as if only one of the advantages were optimized.

The drag reducing additives described herein are expected to be useful in any heavy oil, such as extra heavy crude oil or bitumen, or oils with high bitumen contents, or the like. There is no special or preferred method of introducing the drag reducing additives into the oil. Other common components may be added to the oil, for instance other flow improvers or drag reducers. However in one non-limiting embodiment, the drag reducing additive herein has an absence of a hydrophilic-lipophilic vinylic polymer.

The invention will now be described with respect to specific examples which are not intended to limit the scope of the invention in any way, but to more fully illuminate and illustrate it.

EXAMPLES 6, 9, 10, 11 AND 15

Five formulas were tested on a crude oil which was a Canadian bitumen diluted with between 25-30 vol % naphtha diluent. The naphtha was about 60/40 vol/vol aliphatic/aromatic hydrocarbons. The five formulae had the compositions set out in Table I:

TABLE I

| Test Formulae - Wt % | | | | | |
|---|---|---|---|---|---|
| Formula | 9 | 10 | 6 | 11 | 14 |
| Polymeric alkyl-substituted phenol formaldehyde resin | 5 | 5 | 5 | 5 | 5 |
| Solvent mixture | | | | | |
| Ethyl acetate, wt % | — | 47.5 | — | 95 | 85 |
| Butyraldehyde | 47.5 | — | — | — | — |
| Toluene | 47.5 | 47.5 | 95 | — | — |
| Isopropyl alcohol | — | — | — | — | 10 |

Figure 2:
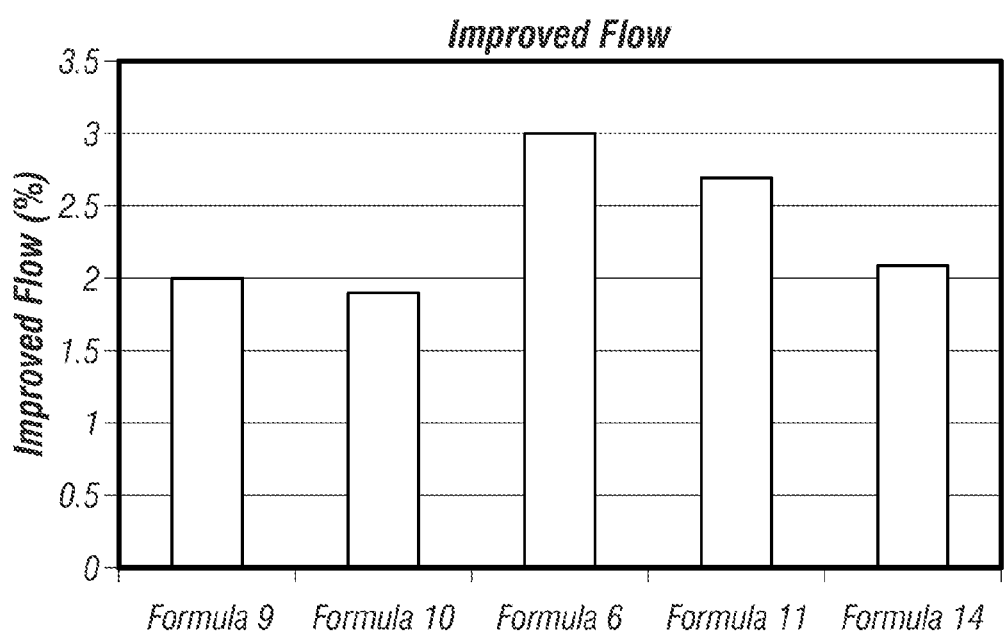
FIG. 2 is a graph showing the improvement in flow due to the five additives of FIG. 1 after testing in a flow loop.
Figure 3:
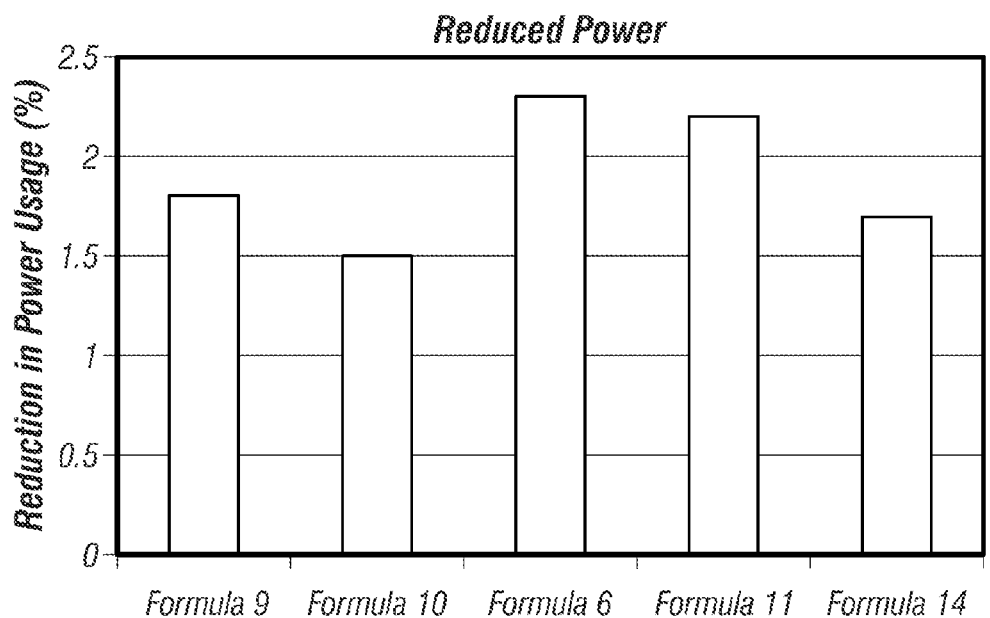
FIG. 3 is a graph showing the reduction in power due to the five additives of FIG. 1 after testing in a flow loop.
Figure 4:
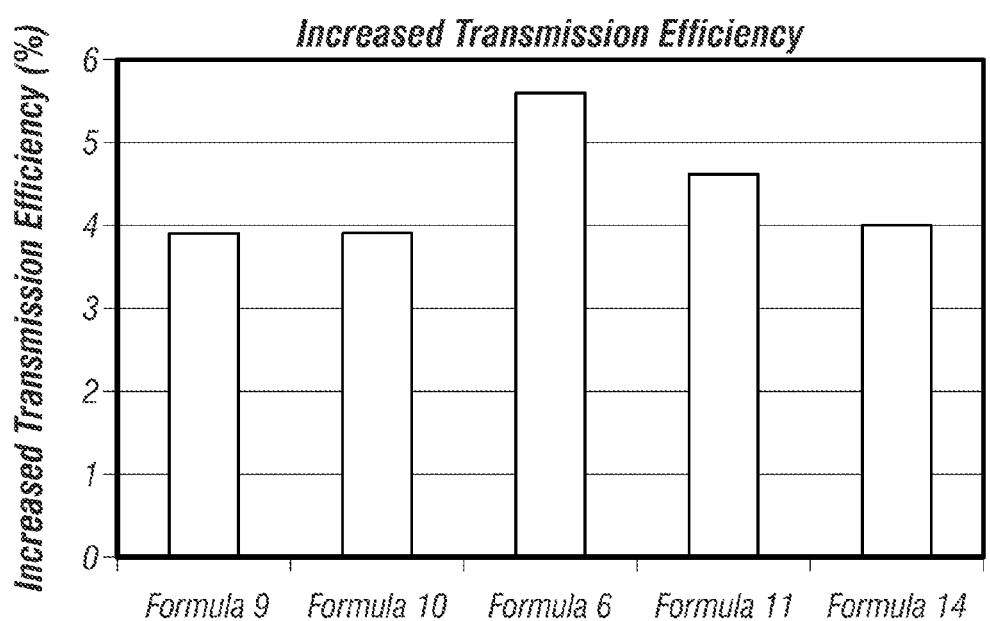
FIG. 4 is a graph of the gain in transmission efficiency in a heavy oil due to the five additives of FIG. 1 after testing in a flow loop.

FIG. 1 shows the viscosity reduction capabilities of various formulations in the methods herein. FIGS. 2 to 4 show the performance of the various additives in a flow loop. At a dose rate of 1 percent, the formulation can increase the flow and reduce the power consumed to pump the heavy oil and the pressure drop in the pipeline simultaneously by about 3 percent each, or keeping the power constant, can increase the flow by about 6 percent.

The additives are miscible with the oil and do not change much as the oil is transported along the pipeline. This has been verified by several hours run on the test flow loop. This means the probability of degradation as the oil is transported along a long pipeline is absent or minimal. This makes the additive mechanism very different from conventional drag reducers, such as ultra-high molecular weight polyalpha-olefins. It is important to the additive that the resin is present for the drag reducing additive to perform best.

Viscosity measurements were conducted with the following formulations, but they were not tested on the flow loop because of cost or other reasons:

TABLE II

Test Formulae

| Formulation No. | Composition, wt % |
|---|---|
| 1 | 100% Toluene |
| 2 | 100% isopropyl alcohol |
| 3 | 100% butyraldehyde |
| 4 | 100% Ethyl acetate |
| 5 | 100% acetonitrile |
| 7 | 95% butyraldehyde 5% resin |
| 8 | 47.5% Ethyl acetate, 47.5% butyraldehyde, 5% resin |
| 12 | 47.5% acetonitrile, 47.5% toluene, 5% resin |
| 13 | 47.5% acetonitrile, 47.5% butyraldehyde, 5% resin |

Many modifications may be made in the methods of and compositions of this invention without departing from the spirit and scope thereof. For example, different resins, esters, aldehydes, aromatic hydrocarbons, diluents, and different proportions may be used from those described or exemplified, and still be within the scope of the invention. Further, the drag reducing additives are expected to be useful in heavy oils other than the specific ones exemplified herein.

The present invention may suitably comprise, consist or consist essentially of the elements disclosed and may be practiced in the absence of an element not disclosed.

The words "comprising" and "comprises" as used herein throughout the claims, are to be interpreted as "including but not limited to" and "includes but not limited to".

What is claimed is:

1. A drag reducing additive comprising:
    a polymeric alkyl-substituted phenol formaldehyde resin; and
    a solvent selected from the group consisting of an aldehyde, and an aldehyde together with an ester.

2. The drag reducing additive of claim 1 where the amount of polymeric alkyl-substituted phenol formaldehyde resin in the additive ranges from about 1 to about 20 wt %.

3. The drag reducing additive of claim 1 where the alkyl group of the polymeric alkyl-substituted phenol formaldehyde resin is a linear or branched alkyl group having from 2 to 20 carbon atoms, and where the polymeric alkyl-substituted phenol formaldehyde resin has a weight average molecular weight ranging from about 1,500 to about 30,000.

4. The drag reducing additive of claim 1 where the additive has a component selected from the group consisting of the following with the indicated proportions, based on the solvent in the total additive:
    from about 10 to about 95 wt % ester; and
    from about 10 to about 95 wt % aldehyde.

5. The drag reducing additive of claim 1 where:
    the ester is selected from the group consisting of ethyl formate, methyl formate, methyl acetate, ethyl acetate, ethyl propionate, dimethyl carbonate, diethyl carbonate, ethyl lactate, and combinations thereof; and
    the aldehyde is selected from the group consisting of formaldehyde, acetaldehyde, propionaldehyde, butyraldehyde, benzaldehyde, and combinations thereof.

6. A drag reducing additive comprising:
    from about 1 to about 20 wt % of a polymeric alkyl-substituted phenol formaldehyde resin having a weight average molecular weight ranging from about 1,500 to about 30,000, where the alkyl group of the polymeric alkyl-substituted phenol formaldehyde resin is a linear or branched alkyl group having from 2 to 20 carbon atoms; and
    a solvent selected from the group consisting of an aldehyde, and an aldehyde together with an ester.

7. The drag reducing additive of claim 6 where the additive has a component selected from the group consisting of the following with the indicated proportions, based on the solvent in the total additive:
    from about 10 to about 95 wt % ester; and
    from about 10 to about 95 wt % aldehyde.

8. The drag reducing additive of claim 6 where:
    the ester is selected from the group consisting of ethyl formate, methyl formate, methyl acetate, ethyl acetate, ethyl propionate, dimethyl carbonate, diethyl carbonate, ethyl lactate, and combinations thereof; and
    the aldehyde is selected from the group consisting of formaldehyde, acetaldehyde, propionaldehyde, butyraldehyde, benzaldehyde, and combinations thereof.

9. A drag reducing additive comprising:
    a polymeric alkyl-substituted phenol formaldehyde resin; and
    a solvent selected from the group consisting of an aldehyde and an aldehyde together with an ester:
        where the ester is selected from the group consisting of ethyl formate, methyl formate, methyl acetate, ethyl acetate, ethyl propionate, dimethyl carbonate, diethyl carbonate, ethyl lactate, and combinations thereof,
        where the aldehyde is selected from the group consisting of formaldehyde, acetaldehyde, propionaldehyde, butyraldehyde, benzaldehyde, and combinations thereof;
    where the additive has a component selected from the group consisting of the following with the indicated proportions, based on the solvent in the total additive:
        from about 10 to about 95 wt % ester; and
        from about 10 to about 95 wt % aldehyde.

10. The drag reducing additive of claim 9 where the amount of polymeric alkyl-substituted phenol formaldehyde resin in the additive ranges from about 1 to about 20 wt %.

11. The drag reducing additive of claim 9 where the alkyl group of the polymeric alkyl-substituted phenol formaldehyde resin is a linear or branched alkyl group having from 2 to 20 carbon atoms, and where the polymeric alkyl-substituted phenol formaldehyde resin has a weight average molecular weight ranging from about 1,500 to about 30,000.

* * * * *